(12) United States Patent
Kemper et al.

(10) Patent No.: US 11,661,564 B2
(45) Date of Patent: May 30, 2023

(54) APPARATUS FOR THE DESOLVENTISATION OF EXTRACTION RESIDUE

(71) Applicant: Desmet USA, Inc., Marietta, GA (US)

(72) Inventors: Timothy G. Kemper, Marietta, GA (US); Marc Kellens, Mechelen-Muizen (BE)

(73) Assignee: DESMET USA, INC., Marietta, GA (US)

( * ) Notice: Subject to any disclaimer, the term of this patent is extended or adjusted under 35 U.S.C. 154(b) by 13 days.

(21) Appl. No.: 16/346,289

(22) PCT Filed: Nov. 6, 2017

(86) PCT No.: PCT/US2017/060146
§ 371 (c)(1),
(2) Date: Apr. 30, 2019

(87) PCT Pub. No.: WO2018/111436
PCT Pub. Date: Jun. 21, 2018

(65) Prior Publication Data
US 2019/0256796 A1 Aug. 22, 2019

Related U.S. Application Data

(60) Provisional application No. 62/420,847, filed on Nov. 11, 2016.

(51) Int. Cl.
*C11B 1/10* (2006.01)
*F26B 17/14* (2006.01)
(Continued)

(52) U.S. Cl.
CPC ............. *C11B 1/10* (2013.01); *F26B 17/14* (2013.01); *A23J 1/144* (2013.01); *A23L 11/32* (2016.08); *Y02P 70/10* (2015.11)

(58) Field of Classification Search
CPC .. A23J 1/144; A23L 11/32; C11B 1/10; F26B 17/14; Y02P 70/10; Y02P 70/40
See application file for complete search history.

(56) References Cited

U.S. PATENT DOCUMENTS

| | | | | |
|---|---|---|---|---|
| 1,540,769 A | * | 6/1925 | Charles | F26B 17/003 |
| | | | | 34/173 |
| 3,018,564 A | * | 1/1962 | Kruse | B01J 8/10 |
| | | | | 34/173 |

(Continued)

FOREIGN PATENT DOCUMENTS

| | | | | |
|---|---|---|---|---|
| EP | 1336426 A1 | 8/2003 | | |
| FR | 36070 E | * 4/1930 | | F26B 17/003 |

OTHER PUBLICATIONS

International Search Report and Written Opinion dated Jul. 30, 2018, issued in International Application No. PCT/US2017/060146, 12 pages.

(Continued)

*Primary Examiner* — Jorge A Pereiro
*Assistant Examiner* — Logan P Jones
(74) *Attorney, Agent, or Firm* — McDonald Hopkins LLC

(57) ABSTRACT

The invention describes an apparatus for the desolventisation and toasting or an apparatus for the combined desolventisation, toasting, drying and cooling of a spent material, i.e., a solvent extraction residue obtained from the solvent extraction of oleaginous material. In particular, the invention describes desolventiser toaster or combined desolventiser toaster dryer cooler of improved design equipped with a side vapours outlet and optionally combined with at least one sieve stripping tray to allow nearly the full saturation of the outgoing vapours with hexane.

12 Claims, 7 Drawing Sheets

(51) Int. Cl.
*A23J 1/14* (2006.01)
*A23L 11/30* (2016.01)

(56) References Cited

U.S. PATENT DOCUMENTS

| | | | | |
|---|---|---|---|---|
| 4,332,092 | A * | 6/1982 | Hansotte | F26B 3/00 34/169 |
| 4,622,760 | A * | 11/1986 | Schumacher | F26B 17/003 34/171 |
| 4,635,380 | A * | 1/1987 | Anderson | B01J 8/10 34/468 |
| 5,884,769 | A * | 3/1999 | Anderson | F26B 17/003 206/557 |
| 5,992,050 | A * | 11/1999 | Kemper | F26B 3/00 34/237 |
| 6,766,595 | B2 * | 7/2004 | Anderson | F26B 17/003 34/526 |
| 9,709,330 | B2 * | 7/2017 | Anderson | F26B 25/006 |
| 2012/0066929 | A1 * | 3/2012 | Kemper | A23L 5/21 34/487 |
| 2012/0266489 | A1 | 10/2012 | Anderson et al. | |
| 2014/0115914 | A1 | 5/2014 | Anderson et al. | |

OTHER PUBLICATIONS

Office Action issued in related German Patent Application No. 11 2017 005 696.9 dated Oct. 6, 2020; 10 pages.
International Preliminary Report on Patentability dated May 14, 2019, issued in International Application No. PCT/US2017/060146, 7 pages.
Examination Report for corresponding Argentina Patent Application No. 20170103078, dated Dec. 15, 2020, 5 pages long.
Office Action issued in related Great Britain Patent Application No. 1906481.5 dated Sep. 3, 2021 4 pages.
Brazilian Office Action for corresponding Brazilian Application No. BR112019008843-1 dated Dec. 21, 2021, 5 pages long.
Brazilian Office Action for corresponding Brazilian Application No. BR112019008843-1 dated Dec. 20, 2022, 6 pages long.

* cited by examiner

APPARATUS FOR THE DESOLVENTISATION OF EXTRACTION RESIDUE

CROSS REFERENCE TO RELATED APPLICATIONS

This application is a national phase of International Patent Application No. PCT/US2017/060146 filed Nov. 6, 2017, which claims priority to U.S. Provisional Patent Application No. 62/420,847 filed Nov. 11, 2016, the entireties of which are incorporated herein by reference.

FIELD OF INVENTION

The invention relates to an apparatus for the desolventisation and toasting or an apparatus for the combined desolventisation, toasting, drying and cooling of a spent material, i.e., a solvent extraction residue obtained from the solvent extraction of oleaginous material. In particular, the invention describes desolventiser toaster or combined desolventiser toaster dryer cooler of improved design equipped with a side vapours outlet and optionally combined with at least one sieve tray to allow nearly the full saturation of the outgoing vapours with hexane. The invention reduces the manufacturing cost of the equipment and its operational cost in particular a lower steam consumption due to higher heat recovery, while its functionality and performance is maintained by comparison with equipment of the prior art.

BACKGROUND OF THE INVENTION

Solvent extraction of oleaginous material, such as soybean, sunflower or rapeseed, yields to a miscella, i.e., a mixture of about 20-30% of oil in solvent (usually hexane), and a residue or spent material, i.e., a substantially defatted material containing about 25-35% of solvent. After careful desolventisation, toasting, drying and cooling of the spent material, a meal is obtained that can serve as feed for animals. The removal and recovery of the solvent contained in the spent material is a significant operation of a solvent extraction facility, since it determines, to a large extent, the quality of the meal and its derivatives. It has also an important influence on the commercial and environmental performance of a solvent extraction plant since complete solvent removal (and its recovery) is an energy intensive step as it requires the use of large amounts of steam, hot air and electrical power.

The removal of the solvent (most usually hexane) contained in the spent material is thermally realized in a piece of equipment called DT (for Desolventiser Toaster) that uses steam for heating and stripping. After the desolventisation and toasting proper, the spent material is dried and cooled in a piece of equipment called DC (for Dryer Cooler) using successively hot and cold air. The DT and the DC can be two standalone pieces of equipment connected together by a conveyor but in many instances, the DT is combined with the DC in a single piece of equipment called DTDC (for Desolventiser Toaster Dryer Cooler). The meal exiting the DC or the DTDC is sufficiently dry, cold and desolventised (and toasted) for safe conditioning and transportation. Such meal has extended shelf-life and can be advantageously used as feed for farming animals for example or as starting material for other extraction processes yielding protein concentrates suitable for humans. Our invention can be implemented in a DT or a combined DTDC but of course, in the latter case, will be confined to the DT sections of the DTDC.

In a DT, the spent material resulting from a hexane extractor is progressively heated from about 55-60° C. to about 108° C. to induce the evaporation and the stripping of the solvent. Simultaneously, live steam, or contact steam is directly put in contact with the spent material to both heat said spent material and eventually strip part of its solvent content. Given the quantity of spent material to be heated (exceeding 50 tons per hour in some large oil mills), the vulnerability of the spent material to over-heating, the environmental obligation to reduce the solvent concentration in the final meal to level below 500 ppm and the requisite to recover the totality of the solvent, a DT must be specifically and carefully designed and is a substantially expensive piece of equipment.

For the sake of comprehensiveness, the DC is similar to the DT in construction, but much shorter since a DC is made usually of only two to four compartments: the first compartments where hot air is used to dry the spent material exiting the DT and which contains about 20% of water and the second compartments where cold air is used to cool the spent material that becomes the final meal. Each compartment is equipped with a hollow chamber acting as a floor to support the spent material with a rotating stirrer above each chamber to mix the spent material. Air is blown through the spent material via the hollow chambers with pierced top plates. In the first compartments, hot air emerges from the pierced top plates and rises through the spent material loaded above and in the second compartments, cold air emerges from the pierced top plates and rises through the spent material loaded above. In the case of a DC, the two compartments are hermitic, i.e., cold air of the bottom compartments will not ingress into the top compartment. Nonetheless, each floor is equipped with adjustable-speed rotary valve or mechanical gate to permit downward movement of the spent material from one compartment to the next one as well as the discharge of the final meal. Typical DC is described for example in U.S. patent application Ser. No. 12/449,703.

The desolventiser toaster dryer cooler (DTDC) is the combination in a single vessel of a DT and a DC, as previously described, with the DT being on top of the DC.

In the field such equipment is known under the name of Dimax DT, Dimax DC or Dimax DTDC supplied by Desmet Ballestra (Belgium). Similar equipment is also supplied by Crown Iron Works (USA) or other suppliers active in the field of supply of desolventising equipment for oil seeds extraction. As a matter of fact, they are all derived from equipment developed in Germany by Schumacher (U.S. Pat. No. 4,622,760) that has been continuously improved over the years.

Such most common type of DT is represented on FIG. 1. Such typical DT consists of a substantially vertical cylindrical vessel (1) comprising several stacked compartments (2 to 7) delimited by trays (8 to 13) each of them fitted with a rotating stirrer (14) attached to a central vertical shaft (15). The rotating stirrers (14) spread the spent material and provide a gentle mixing action. Spent material, straight from the solvent extractor and having a temperature of about 55-60° C. (in case of hexane extraction), is continuously fed at the top of the desolventiser toaster (16) in the uppermost compartment (2) and lays first on the uppermost top tray (8). The top trays (2, 3) do not extend radially out to the walls of the DT vessel contrary to the bottom trays (10 to 13) which extend radially out to the walls of the DT vessel. Therefore, the top trays are equipped with circular metallic rings at the perimeter to confine properly the spent material. Each bottom trays floors are equipped with adjustable-speed rotating valve (17), to permit downward movement of the spent material, through each bottom tray, at the desirable rate but prevent the passage of rising contact steam. The top trays (2, 3) are simply provided with a gravity discharge opening (18) to permit the downward movement of the spent material which is constantly pushed by the stirrers. The size (surface) of this opening will amount for typically from 5 to 10% of the total size (surface) of a top tray. This opening is most often unique and located typically as a trapezoidal shape on a radial line of the tray. FIG. 1 depicts a DT comprising two top trays (also known in the art as pre-desolventising trays) and 4 bottom trays (also known in the art as stripping trays) but DT with more or less top (pre-desolventising) and/or more or less bottom (stripping) trays can be found. From now on the terms pre-desolventising tray(s) and stripping tray(s) will be used. Two methods of heating the spent material are simultaneously used: direct steam heating (or contact steam) and indirect steam heating. For heating with indirect steam, both the pre-desolventising and all the stripping trays are equipped with hollow chambers acting as steam jackets to which steam is supplied (not shown). For direct steam heating, hot live steam (typically generated in a boiler) and from now on called "contact steam" is injected (19) into the spent material mass via the lowest stripping tray, a hollow chamber sparging tray (13) known in the art as the sparging tray. The contact steam ascends (20) through the spent material via small holes pierced in the floor of the sparging tray (13). The size and shape of the small holes are optimized to favour the flow of the contact steam as much as possible while minimizing the ingress of the spent material into those small holes. The diameter of those small holes will be typically about 4 mm. The steam then ascends upward through the remaining stripping trays via groupings of slots, typically 2 mm in width, or groupings of holes typically 15-20 mm in diameter, embedded across the stripping tray. In existing DT, the stripping trays are jacketed as well for combining simultaneous indirect and direct heating of the spent material but the pre-desolventising trays are only jacketed but are not equipped with groupings of small holes or slots and provide therefore only indirect heating. Then, the contact steam or vapours, progressively loaded with more and more solvent vapours continue its ascension (21) passing through each stripping tray and the spent material loaded on them, passing around the periphery (22) of the pre-desolventising trays (2,3) to finally exit the vessel via the top vent (23). Those vapours, which at this stage contain a large proportion of hexane (typically 91% of hexane and 9% of water, w/w), are then condensed to recover the solvent which is recycled in the solvent extraction process. While the contact steam or vapours progressively ascend from the bottom to the top of the DT, the spent material descends from the top to the bottom of the DT and finally exits through a rotating valve (24). At this point, the spent material will be dried and cooled in a drier cooler. This drier cooler can be combined or not to the DT.

The use of contact steam is mandatory. Indeed, the heat transfer from the heated surface of the trays floor to the spent material is slow and difficult, especially considering the spent material bed height (from about 0.2 to 1.2 meter) loaded in each compartment. The direct contact between the solid spent material and the contact steam is a more efficient method of heating but the downside is that the condensation of the majority of the contact steam into the spent material adds moisture to it that must be removed afterwards in the DC. Of course, as the spent material progresses in the DT, its temperature increases, and therefore, a growing part of contact steam will not condense on the spent material anymore, but instead the contact steam will have an increased stripping action, thus removing further the solvent. Consequently, this stripping action occurs predominantly in the stripping trays and even more significantly in the lowest stripping trays. Simultaneously the spent material is toasted. Indeed, the combined action of temperature, moisture and time induces the inactivation of the anti-nutritional factors along with the denaturation of some proteins which enhances the quality and the palatability of the meal to animals.

The two pre-desolventising trays are simply jacketed trays and designed to heat the spent material indirectly, i.e., relying solely to the heat transfer between the top surface of those pre-desolventising trays and the spent material. These trays are therefore not pierced by a multitude of the small holes or slots to allow the passage of contact steam. This is why these trays are known in the art as the pre-desolventising trays. Indeed, in the current design of most DT of the prior art as depicted on FIG. 1, the pre-desolventising trays do not extent radially outward to the wall of the vessel in order to create a passage for the hot vapours loaded with solvent that must exit the vessel via the top vent. Hence, only minimal contact with the rising vapours is possible but this contact is not efficient because only the top layer of the spent material will have a possibility to have contact with the vapours. Typically, about 5% of the solvent contained in the spent material will be evaporated for each pre-desolventising tray. So for a DT equipped with two pre-desolventising trays, about 10% of the solvent contained in the spent material will be evaporated in the pre-desolventising tray and about 90% will be evaporated in the stripping trays.

The design of current DT, as depicted on FIG. 1, has several additional downsides. The first one is that in order to minimise the velocity of the ascending vapours around the pre-desolventising trays, maximum open area is needed for said vapours. This maximum open area can be accomplished by minimising the diameter of the predesolventising trays, which reduces heat transfer surface, or by increasing the diameter of the outer vessel shell such as depicted on FIG. 1. This design is known in the art as the "mushroom" shape, bringing additional building constraints and related costs compared to a cylindrical vessel having a constant diameter. This mushroom shape brings also additional cost in order to secure the pre-desolventising trays in place. Indeed, cantilever beams must be used and welded to the wall of the vessel. Furthermore, a metallic ring must by welded to the full perimeter of each pre-desolventising trays in order to confine the spent material properly. This adds complexity and requires expensive material, usually stainless steel.

Another existing DT design of the prior art includes a chimney in the centre of the pre-desolventising trays where the vapours can ascend to a top outlet. However, this design is also complex, reduces the surface of the pre-desolventising trays and require costly rotating stirrers which must reach over the centre chimney to the said pre-desolventising trays.

The stripping trays are another particularly costly component of a DT. Indeed, those trays are both jacketed and pierced which require abundant high precisions and meticulous welding to avoid leakage.

Therefore, there is a need in the art for an improved DT or DTDC. The present invention overcomes the problems outlined above and provides an improved apparatus for the desolventisation of spent material (extraction residues). The present invention is limited to such DT or DTDC made of stacked trays as described previously. The present invention can be applied to the DT and/or the DTDC, irrespective to the fact that those pieces of equipment are standing alone or are combined into a single vessel known as a DTDC.

OBJECTS OF THE INVENTION

It is therefore an object of the invention to provide an improved equipment for the desolventisation and toasting or the desolventisation, toasting, drying and cooling of spent material with improved design, in particular having a simplified design leading to significantly lower DT manufacturing cost.

It is also an object of the invention to provide an improved equipment for the desolventisation and toasting or the desolventisation, toasting, drying and cooling of spent material with improved design allowing in particular a reduced consumption of the contact steam and/or heating steam necessary to treat a given amount of spent material.

It is also an object of the invention to provide an improved equipment for the desolventisation and toasting or the desolventisation, toasting, drying, and cooling of spent material with improved design allowing lower energy demand for the condensation of solvent laden vapours exiting the DT or DTDC.

Other aspects and advantages of the present invention will appear in the detailed description of the invention.

SUMMARY OF THE INVENTION

It has surprisingly been found that the above objects can be attained by an apparatus for the continuous treatment of spent material, said treatment including the desolventisation and toasting of said spent material, said apparatus including a vertically erected cylindrical vessel, said vessel including at least one substantially horizontal pre-desolventizing tray and at least one substantially horizontal stripping tray, said trays extending up to the wall of said vessel, said at least one stripping tray being below the at least one pre-desolventizing tray, said trays being equipped with rotating stirrer for the mixing and progression of said spent material, said at least pre-desolventising tray being equipped with hollow chamber and means for the supply of heating steam into said hollow chamber for the indirect heating of said spent material, said pre-desolventising tray being further equipped with at least one opening allowing the gravity discharge of the spent material to the adjacent inferior tray, said stripping tray being equipped with hollow chamber and means for the supply of heating steam into said hollow chamber and said stripping tray being further equipped with numerous small holes or slots allowing the upward passage of contact steam, said stripping tray being further equipped with at least one rotating valve or chute allowing the discharge of spent material from one stripping tray to the tray below but preventing the upward passage of the contact steam, wherein said apparatus is further equipped for the continuous feeding of spent material, said spent material descending from one tray to the next one while pushed by the rotating stirrers, said apparatus being further equipped of at least one sparging tray located below the at least one stripping tray, said sparging tray being further equipped with means of sparging contact steam in the spent material laying on said sparging tray, said contact steam rising and going through at least one stripping tray via the small holes and/or slots and consequently contacting the spent material loaded on said at least one stripping tray and consequently said contact steam turns into solvent laden vapours, characterized in that solvent laden vapours are evacuated by at least one side vapours outlet located below the at least one pre-desolventizing tray and above the at least one stripping tray and in that the solvent evaporated from the spent material loaded on the at least one pre-desolventizing tray is evacuated co-currently and in a downwards motion with the spent material through the at least one opening located in said at least one pre-desolventizing tray.

The vessel diameter of the above described DT is either substantially constant or alternatively, the diameter of any section of the DT or DTDC shell may be larger than another.

In another aspect of the invention, it has surprisingly been found that the above objects can be attained by an apparatus as described here above further including at least one sieve tray substantially horizontal and extending radially out to the wall of the vessel said at least one sieve tray being fitted with a multitude of small holes or slots allowing the passage of rising contact steam through said at least one sieve tray and the spent material loaded on said at least one sieve tray, said at least one sieve tray being further equipped with a rotating valve or chute allowing the passage of said spent material to the adjacent inferior tray, said rotating valve or chute being substantially hermetic to said contact steam characterized in that said at least one sieve tray is not jacketed and located below the at least one side vapour outlet.

In still another aspect of the invention, the apparatus as described above is further equipped of additional side solvent nozzles directly connecting the at least one side vapours outlet to each compartments above each pre-desolventizing trays.

DEFINITIONS

Figure 1:
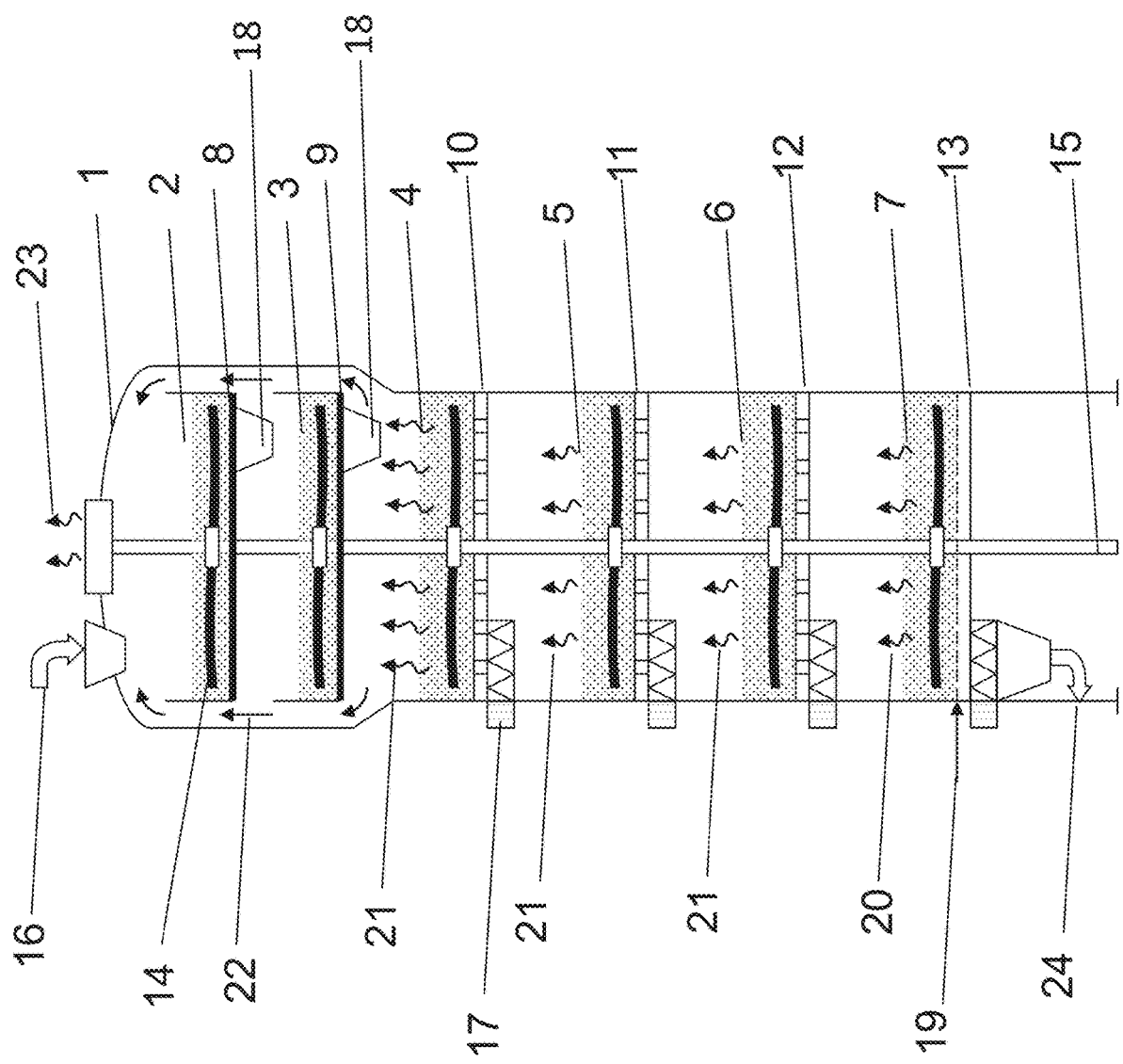
FIG. 1 depicts a standard DT as currently used in the field.

DT. In the context of the present invention, "DT" refers specifically to a desolventiser toaster made of stacked trays where spent material is continuously supplied to the top of the DT and move progressively downwards by gravity under the action of rotating stirrers from the uppermost tray to the lowest tray while contact steam is rising upwards and contacted with the spent material loaded on the stripping trays.

DC. In the context of the present invention, "DC" refers to a dryer cooler made of at least two stacked trays where spent material, in particular desolventised and toasted spent material, is continuously supplied to the top tray and move progressively downwards by gravity under the action of rotating stirrers from the top tray to the bottom tray while hot air is rising upwards and contacted with the spent material in the top tray(s) and while cold air is rising upwards and contacted with the spent material in the bottom tray(s).

DTDC. In the context of the present invention, "DTDC" refers to a desolventiser toaster dryer cooler made by the combination of a DT and DC in a single vessel, the DT being on top of the DC.

Functionality (of a DT or DTDC). In the context of the invention, the term "functionality" is the ability of a DT or DTDC to produce a desolventised and toasted spent material or a desolventised toasted dried and cooled spent material of acceptable properties such as having a residual solvent concentration below a standard value, for example less than 500 ppm.

Performance (of a DT or DTDC). In the context of the invention, the term "performances", refers to the energy consumption needed to desolventise and toast or to desolventise toast dry and cool one ton of spent material having a given concentration of solvent to yield a final product having acceptable properties. Energy consumption encompasses electricity but also steam since energy is necessary to produce steam.

Spent material. In the context of the present invention, "spent material" refers to the solid residue resulting from the solvent extraction of oleaginous material such as for example soybean, sunflower or rapeseed. The "spent material" encompasses the material coming directly from the solvent extractor and the material that may have undergone a preliminary partial desolventization in a flash vessel. In the context of the invention "spent material" also encompasses all the intermediates and final materials that are processed in a DT, DC or DTDC and that, for example, may be partially desolventised but still not toasted, dried, and cooled or that may be desolventised, toasted, dried but still not cooled. In the context of the invention "spent material" also encompass the desolventised spent material that is desolventised and toasted but not dried and cooled and further encompasses the meal that is the final material exiting the DC or DTDC that is desolventised toasted dried and cooled.

Pre-desolventizing trays. In the context of the present invention, pre-desolventizing trays refer specifically to steam filled hollow chambers that are not pierced by a multitude of small holes or slots for the passage of contact steam. They are however provided with an opening to allow the downward progression of the spent material from one tray to another. In our invention, the pre-desolventizing trays are extending radially out to the wall of the DT vessel and are not equipped with a central chimney.

Stripping trays. In the context of the present invention, stripping trays refer specifically to steam filled hollow chambers that are pierced with a multitude of small holes or slots to allow the passage of the contact steam in an upward movement but are sized to prevent the downwards passage of the spent material into those small holes or slots. However, any stripping tray is provided with a chute or rotary valve that allows the downwards progression of the spent material from one tray to another but such chute or rotary valve prevents the upwards passage of contact steam. The sparging tray is the lowest of the stripping trays and is structurally different. Indeed, in the sparging tray, the contact steam is injected via a hollow chamber with top plate pierced with small holes, and the steam filled hollow stripping trays which allow for indirect and direct heating of the spent material.

Sieve tray. In the context of the present invention, a sieve tray refers specifically a tray which is not hollow or jacketed but simply pierced with a multitude of smalls holes or slots to allow the passage of the contact steam in an upward movement but are sized to prevent the downwards passage of the spent material into those small holes or slots. However, any sieve tray is provided with a chute or rotary valve that allows the downwards progression of the spent material to another adjacent tray but such chute or rotary valve prevents the upwards passage of contact steam.

Contact steam. In the context of the invention contact steam refers to hot steam injected in the sparging tray. This contact steam rises and progresses through the spent material loaded on each stripping tray until the majority of said contact steam condenses in the spent material supported by the uppermost stripping tray. As a matter of fact, as soon as the contact steam is in contact with the spent material it will contain some solvent due to its stripping action. Hence, the contact steam is progressively and increasingly loaded with the solvent in its ascension from the point of injection up to exiting the spent material layer on the uppermost stripping tray, where the solvent rich vapour steam is then composed of approximately 91% of solvent (hexane) vapour and 9% of water vapour (w/w). In the text the term contact steam is used but strictly speaking it is vapours (a mix of solvent and steam) that became richer in solvent while ascending through the DT. However, this vapour still contains steam having the capacity to heat the spent material and/or to strip the solvent contained in the spent material and hence, to simplify, the skilled artisans often use the term "contact steam" instead.

DETAILED DESCRIPTION OF THE INVENTION

The invention will be described with the help of FIGS. 2 to 4. However, our invention is not limited by those figures but only by the claims.

Figure 2:
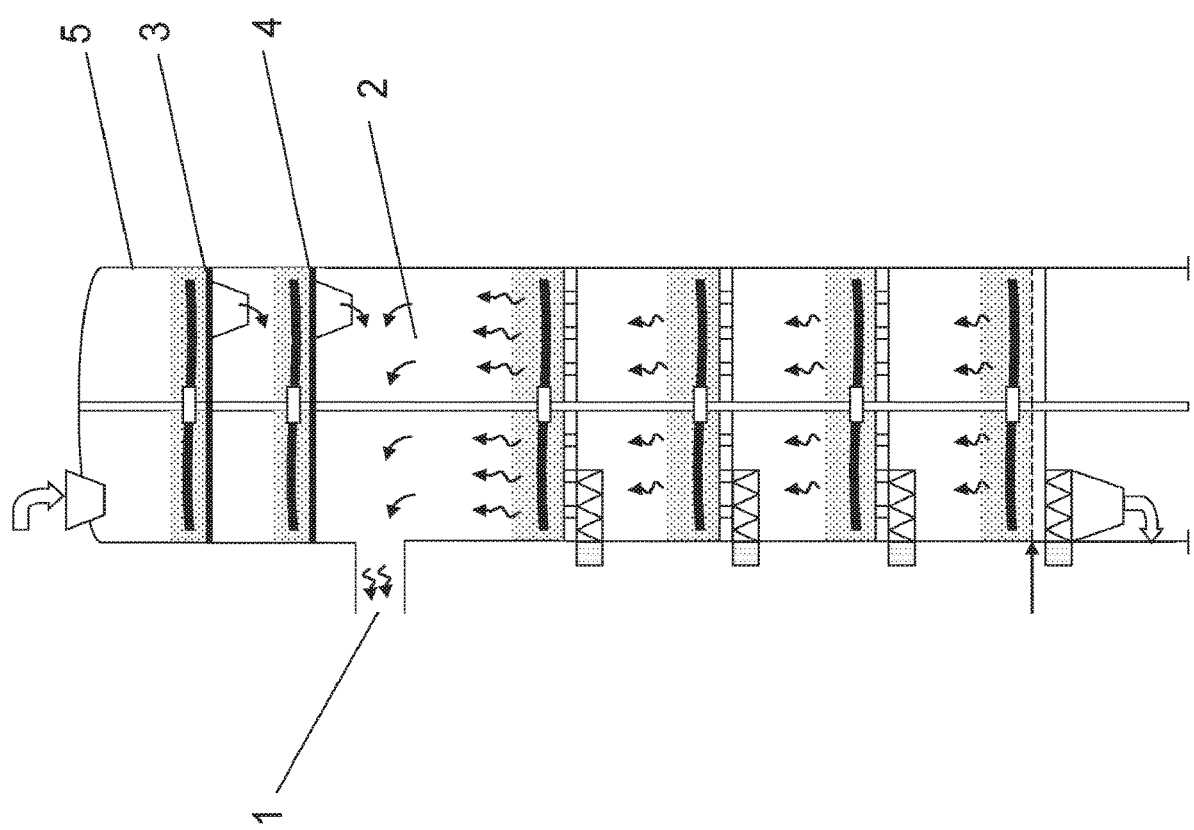
FIGS. 2, 3, 4, and 5 depict several embodiments according to the present invention.
Figure 3:
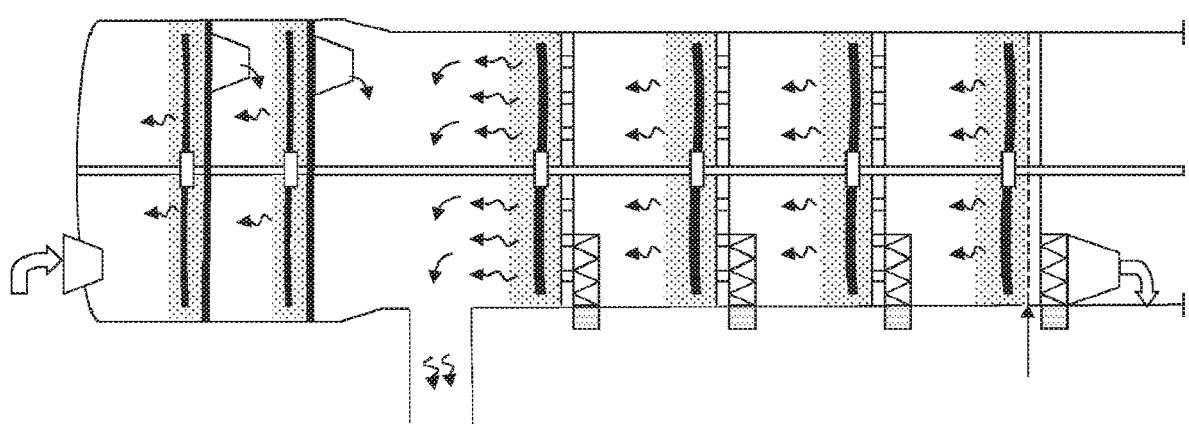

A first embodiment is depicted on FIG. 2. In this design, a side vapours outlet (1) is fitted in the compartment (2) below the lowest pre-desolventising tray (4) and above the uppermost stripping tray. This design allows a much more economical construction since now said pre-desolventising trays (3, 4) can extend radially out to the walls (5) of the DT vessel. In the case where the pre-desolventising tray diameter is similar to the diameter of the stripping trays, the DT walls can be a continuous similar diameter and less expensive to design and manufacture in comparison to the current equipment having a mushroom shape DT vessel depicted in FIG. 1. In the pre-desolventising trays, the spent material still contains its maximal content of solvent and is heated indirectly by the steam filled hollow chamber heated trays. Therefore, a small, however significant, quantity of solvent or water-solvent azeotrope are evaporated and must be continuously evacuated from the vessel. In the case of a DT equipped with two pre-desolventising trays, about 10% of the solvent contained in the spent material will be evaporated on those pre-desolventising trays. It has surprisingly been observed that this continuous solvent vapours evacuation can take place via the opening located in each of the pre-desolventising trays that was normally designed for the downward progression of the spent material. Surprisingly, the solvent vapours and the spent material can both progress in a co-current manner through the opening located in each of the pre-desolventising trays. As stated before, this spent material progression is effected with the rotating stirrer mixing and pushing gently the spent material. Consequently, in our invention, the solvent vapours evaporated from the spent material loaded on the pre-desolventising trays are moving downwardly instead as upwardly as in equipment of the prior art. In our invention, there is no need of a specific passage, channel or chimney for the progression and evacuation of the solvent vapours evaporated from the spent material loaded on the pre-desolventising trays. Thus, the apparatus depicted in FIG. 2 is advantageous for the treatment of spent material said treatment including the desolventisation and toasting of said spent material (DT) in which the solvent vapours being removed on the pre-desolventising trays pass downward instead of upward, co-current with the spent material downward flow through the opening located in each pre-desolventising tray. This thereby allows the pre-desolventizing trays to extend across the full diameter of the DT vessel as no specific vapour path is required around them to allow the vapours from the lower stripping trays to upwardly pass. The solvent loaded vapours from both the pre-desolventising trays and the stripping trays are then evacuated by at least one side vapour outlet located below the lowest of the pre-desolventising trays and above the uppermost stripping trays. To be complete, additional savings for having the side vapour outlet as described above is that it is closer in elevation to the downstream DT vapour scrubber elevation which can save ducting expenses and potentially reduce building height by lowering the high point of that duct.

Figure 6:
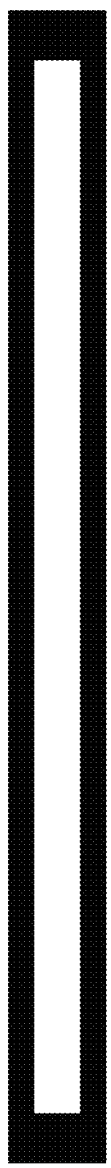
FIG. 6 depicts a cross-section of a pre-desolventising tray having a hollow chamber according to an embodiment of the present invention.
Figure 7:
FIG. 7 depicts a cross-section of a stripping tray having a hollow chamber according to an embodiment of the present invention. However, the present invention is not limited by those figures but only by the claims.

FIG. 6 depicts a cross-section of a pre-desolventising tray having a hollow chamber according to an embodiment of the present invention. FIG. 7 depicts a cross-section of a stripping tray having a hollow chamber according to an embodiment of the present invention.

FIG. 2 depicts a DT according to our invention with a main vessel having a strictly constant diameter. Such design corresponds to a very economical manufacturing cost. However, a DT having a mushroom shape, i.e., having the pre-desolventising compartments of larger diameter than the one of the stripping compartments will fall into the scope of our invention as long as the pre-desolventising trays are extending radially out to the walls of the DT without central chimney and that the solvent vapours or the water/solvent azeotrope that is evaporated from the spent material loaded on each pre-desolventising tray moves downwardly co-currently with the spent material and are finally evacuated by the side vapour outlet. Such design is shown on FIG. 3. Such design is less economical to manufacture that the straight DT design of our invention as defined above and depicted on FIG. 2 but is still more economical than DT of prior art equipped with pre-desolventising trays that are not extending radially out to the walls or DT of the prior art equipped with a central chimney. However, the design of the DT as depicted on FIG. 3 will have the advantage of having pre-desolventising trays of larger surface. But independent on the actual diameter of the pre-desolventising trays, the novelty of our apparatus equipped of a side vapours outlet below the pre-desolventising trays was in the surprising finding that we can successfully use the pre-desolventising tray spent material discharge openings for the spent material to pass downward from one pre-desolventising tray to the next tray to also serve the second purpose of allowing the solvent vapours created in the pre-desolventising trays to pass down co-current with that spent material instead of upward and through a specific conduit as in traditional DTs. The at least one side vapours outlet allows the vapours created in the DT, coming from the stripping trays, to exit before reaching the pre-desolventising trays, and therefore, no vapours conduit is required around the pre-desolventising trays for this large vapour stream to pass by. Removing the necessity of that vapour channel around the pre-desolventising trays then allows the trays to cover the full DT diameter, saving equipment cost. Both for DT having a vessel of strictly constant diameter (straight DT) or for DT having expanded diameter in the pre-desolventising section (mushroom DT), the primary point of reducing cost is that we utilize the full diameter of the DT vessel to obtain our required pre-desolventising tray surface area. The savings could be either one fewer pre-desolventising tray in a same DT vessel diameter or keeping the same number of pre-desolventising trays in a smaller DT vessel diameter. An added savings come from eliminating the welded ring at the perimeter of each pre-desolventising tray and eliminating the cantilevered beam pre-desolventising tray supports.

Figure 4:
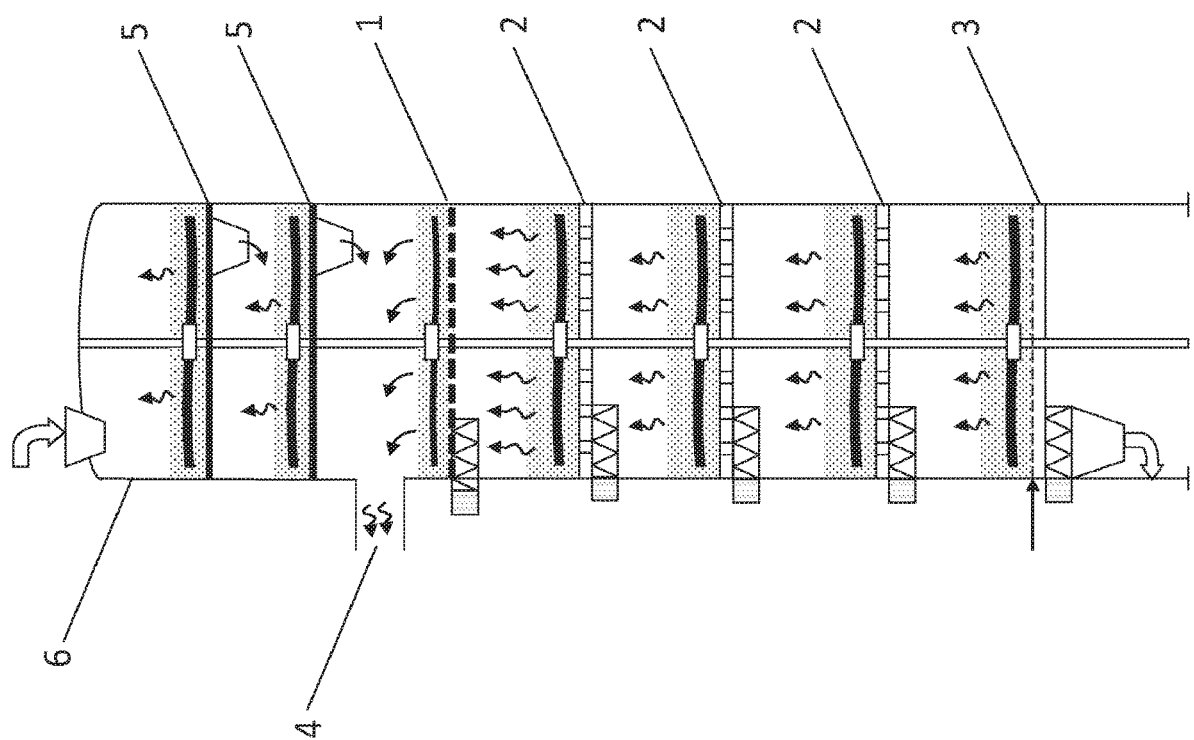

Another embodiment of the invention is shown in FIG. 4. Said DT as depicted in FIG. 4 includes at least one additional sieve tray (1) in addition to the existing standard stripping trays (2) and in addition to the standard and existing sparging tray (3). A sieve tray is a pierced tray allowing the passage of the solvent vapour with remaining contact steam but a sieve tray is not hollow. This sieve tray has a limited cost and as a matter of fact a cost that does not offset the cost reduction generated by the simple design including the side vapours outlet (4) combined to pre-desolventising trays extending radially out to the DT vessel wall (5). The advantage of such sieve tray is the fact that the rising vapours reduce in temperature by contacting the 60-65° C. spent material descending from the pre-desolventising trays which results in a further portion of the remaining contact steam in the rising vapours condensing in the spent material loaded on said sieve tray, thus additional heat is extracted from said rising vapours before they reach the side vapours outlet. Additionally, said vapours are protected from superheating by no longer passing around the hot pre-desolventising trays before exit, thus saving further steam. It has surprisingly been found that for a DT equipped with a sieve tray as described above and as depicted in FIG. 4, the quantity of stripping steam necessary to remove the solvent contained in one ton of spent material can be reduced in comparison to a DT of prior art design. This observation is even more surprising given the fact that the manufacturing cost of such DT described in FIG. 4 is lower than a DT of current design. Thus, the apparatus depicted in FIG. 4 is for the treatment of spent material said treatment including the desolventisation and toasting of said spent material in which the uppermost of the stripping trays is a simple sieve tray which is not hollow and steam filled and hence not indirectly providing heat. Such sieve tray allows the rising solvent laden vapours to cool to the azeotropic equilibrium temperature, carrying with them less water vapour, and thus saving steam in the DT. This saving in steam consumption in the DT of our invention is due to the fact that a larger portion of the injected contact steam will condense in the spent material, thus the heat transfer between said contact steam and the spent material will be more complete, and hence, less contact steam will be needed for the same heating and stripping effect. But additional saving comes from the fact that the resulting hot vapours leaving the DT are more concentrated in solvent (hexane) vapour with less water vapour and lower in temperature and thus require less energy for condensing them in view of the hexane recycling in the solvent extraction step.

The DT of our invention equipped with an additional sieve tray on top of the existing standard stripping trays allows the vapors leaving the DT to further cool by condensing some of the steam left in those vapors into the relatively cold (60-65° C.) spent material supported on said sieve tray. Vapors normally at 71° C. with 91% solvent vapor/9% steam (w/w) can further cool and concentrated in solvent. For example, those vapors cool to about 66° C. with 93% solvent vapor/7% steam (w/w). The reduction of steam leaving with the solvent vapours means we capture more of the latent heat of the contact steam in the DT and therefore save in overall steam consumption. It must be explained that the spent material leaving the last pre-desolventising tray is still relatively cold (60-65° C.) since the solvent evaporation taking place on those pre-desolventising trays have a cooling effect and the heating provided by said pre-desolventising trays is limited the contact heating and hence not very efficient. As a matter of fact, the spent material is only about 5° C. warmer than at the exit of the solvent extractor.

Thus the sieve tray can be seen as a vapours saturation tray. Furthermore, it has been observed that that the combination of the side vapours outlet as defined above and the addition of the uppermost sieve tray as defined above reduce steam consumption furthermore by no longer superheating the rising solvent rich vapours by the above pre-desolventising trays before said solvent rich vapour exit the DT. Indeed, in DT of prior art, those solvent rich vapours leaving the last stripping tray have a temperature of about 68° C. due the azeotrope between water and hexane. Therefore, said solvent rich vapours will have a cooling effect on the bottom of the pre-desolventising trays that are typically heated at about 185° C. Therefore, the subsequent energy required to maintain the temperature of 185° C. in these pre-desolventising trays will be higher than in a DT of our invention where those solvent rich vapours are directly directed to the side vapours outlet minimizing thus any contact with pre-desolventising trays. Furthermore, it DT's of the prior art, said solvent rich vapours will be heated by the bottom of the pre-desolventizing trays that are set at 185° C. and thus the subsequent cooling and condensation to recover the solvent (hexane) contained in said vapours will need more energy than for the DT according to our invention.

On FIG. 4 the sieve tray is placed above the uppermost standard stripping tray i.e. a steam-filled hollow chamber stripping tray. Alternatively, a standard stripping tray, i.e., a steam-filled hollow chamber stripping tray, can be replaced by two sieve trays. The replacement of one standard stripping trays by two sieve trays still represents a manufacturing cost reduction since the value of a sieve tray is only a fraction (typically about 30%) of the value of a standard stripping tray. As explained above this is due to the fact that not only more expensive material is needed to build a standard stripping tray but also extensive precision welding is required in order to avoid any leaking. Alternatively, the sieve tray can replace the uppermost stripping tray.

Figure 5:
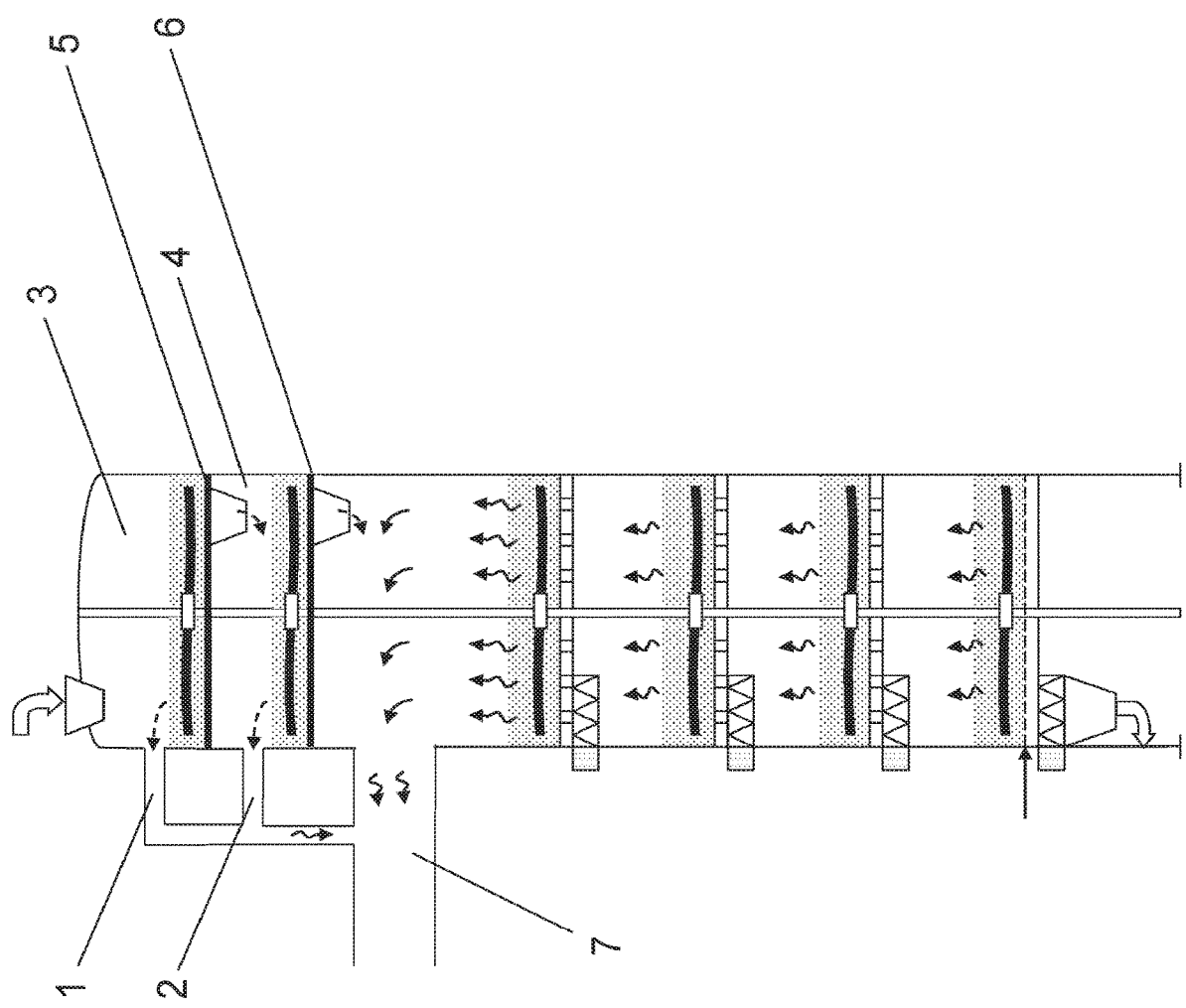

A variant of the above described embodiments makes use of additional side solvent vapours nozzles directly connecting the side vapours outlet to each compartments above each pre-desolventizing trays. FIG. 5 shows the side solvent vapours nozzles (1) and (2) connecting directly the compartments (3) and (4) above each pre-desolventizing trays (5) and (6) to the side vapours outlet (7). FIG. 5 depicts a DT according to our invention that does not include a sieve tray. However, it is understood that a DT equipped with a sieve tray as defined in this invention can also be equipped with side solvent vapours nozzles. The term side solvent vapours nozzle is accurate since it is only solvents and/or water-solvent azeotrope that will be collected by the said side solvent vapours nozzle. Those side solvent vapours nozzles typically induce a marginal cost increase but may be preferred in case some specific spent material are processed that are compact and bringing and that may prevent a regular or a sufficient passage of the solvent vapours through the opening of each pre-desolventising tray. Therefore, additional side solvent vapours nozzles as described above may be necessary. However, this situation was not observed in our trials with spent material coming from the solvent extraction of soybean, rapeseed or sunflower. Thus, those optional side solvent vapours nozzles would not be useful and therefore not used for the vast majority of spent material. However, those optional side solvent vapours nozzles could be necessary if the extraction facility would process an unusual seed. In fact, those optional side solvent vapours nozzles should be seen as safety feature, i.e., an emergency by-pass that could be used when processing the non-standard spent materials.

The invention claimed is:

1. Apparatus for the continuous treatment of spent material, said treatment including the desolventisation and toasting of said spent material, said apparatus including a vertically erected cylindrical vessel, said vessel including at least one substantially horizontal pre-desolventising tray and at least one substantially horizontal stripping tray, said at least one substantially horizontal pre-desolventising tray and/or said at least one substantially horizontal stripping tray extending up to the wall of said vessel, said at least one stripping tray being below the at least one pre-desolventising tray, said trays being equipped with rotating stirrer for the mixing and progression of said spent material, said at least one pre-desolventising tray being equipped with hollow chamber configured to receive a supply of heating steam into said hollow chamber for the indirect heating of said spent material, said pre-desolventising tray being further equipped with at least one opening allowing the gravity discharge of the spent material to the adjacent inferior tray, said at least one stripping tray being equipped with hollow chamber configured to receive a supply of heating steam into said hollow chamber and said stripping tray being further equipped with numerous small holes or slots allowing the upward passage of contact steam, said stripping tray being further equipped with at least one rotating valve or chute allowing the discharge of spent material from one stripping tray to the tray below but preventing the upward passage of the contact steam, wherein said apparatus is further equipped for the continuous feeding of spent material, said spent material descending from one tray to the next one while pushed by the rotating stirrers, said apparatus being further equipped of at least one sparging tray located below the at least one stripping tray, said sparging tray being further configured to sparge contact steam in the spent material laying on said sparging tray, said contact steam rising and going through at least one stripping tray via the small holes and/or slots and consequently contacting the spent material loaded on said at least one stripping tray and consequently said contact steam turns into solvent laden vapours, wherein solvent laden vapours are evacuated by at least one side vapours outlet located below the at least one pre-desolventising tray and above the at least one stripping tray and in that the solvent evaporated from the spent material loaded on the at least one pre-desolventising tray is evacuated co-currently and in a downwards motion with the spent material through the at least one opening located in said at least one pre-desolventising tray.

2. The apparatus as recited in claim 1, wherein the vessel diameter is substantially constant.

3. The apparatus as recited in claim 1, wherein the diameter of the section of the vessel surrounding the pre-desolventising trays is larger than the part of the vessel surrounding the stripping trays.

4. The apparatus as recited in claim 1, further including at least one sieve tray substantially horizontal and extending radially out to the wall of the vessel said at least one sieve tray being fitted with a multitude of small holes or slots allowing the passage of rising contact steam through said at least sieve tray and the spent material loaded on said at least one sieve tray, said at least one sieve tray being further equipped with a rotating valve or chute allowing the passage of said spent material to the adjacent inferior tray, said rotating valve or chute being substantially hermetic to said contact steam wherein said the at least one sieve tray is not hollow or steam-filled and located below the side vapour outlet and above the sparging tray.

5. The apparatus as recited in claim 1, wherein the solvent is hexane.

6. The apparatus as recited in claim 1, wherein the spent material is an oleaginous material.

7. Apparatus for the continuous treatment of spent material, said treatment including the desolventisation and toasting of said spent material, said apparatus including a vertically erected cylindrical vessel, said vessel including at least one substantially horizontal pre-desolventising tray and at least one substantially horizontal stripping tray, said at least one substantially horizontal pre-desolventising tray and/or said at least one substantially horizontal stripping tray extending up to the wall of said vessel, said at least one stripping tray being below the at least one pre-desolventising tray, said trays being equipped with rotating stirrer for the mixing and progression of said spent material, said at least one pre-desolventising tray being equipped with hollow chamber configured to receive a supply of heating steam into said hollow chamber for the indirect heating of said spent material, said pre-desolventising tray being further equipped with at least one opening allowing the gravity discharge of the spent material to the adjacent inferior tray, said at least one stripping tray being equipped with hollow chamber configured to receive a supply of heating steam into said hollow chamber and said stripping tray being further equipped with numerous small holes or slots allowing the upward passage of contact steam, said stripping tray being further equipped with at least one rotating valve or chute allowing the discharge of spent material from one stripping tray to the tray below but preventing the upward passage of the contact steam, wherein said apparatus is further equipped for the continuous feeding of spent material, said spent material descending from one tray to the next one while pushed by the rotating stirrers, said apparatus being further equipped of at least one sparging tray located below the at least one stripping tray, said sparging tray being further configured to sparge contact steam in the spent material laying on said sparging tray, said contact steam rising and going through at least one stripping tray via the small holes and/or slots and consequently contacting the spent material loaded on said at least one stripping tray and consequently said contact steam turns into solvent laden vapours, wherein solvent laden vapours are evacuated by at least one side vapours outlet located below the at least one pre-desolventising tray and above the at least one stripping tray and in that the solvent evaporated from the spent material loaded on the at least one pre-desolventising tray is evacuated co-currently and in a downwards motion with the spent material through the at least one opening located in said at least one pre-desolventising tray, wherein said solvent is hexane and/or said spent material is an oleaginous material.

8. The apparatus as recited in claim 7, wherein the vessel diameter is substantially constant.

9. The apparatus as recited in claim 7, wherein the diameter of the section of the vessel surrounding the pre-desolventising trays is larger than the part of the vessel surrounding the stripping trays.

10. The apparatus as recited in claim 7, further including at least one sieve tray substantially horizontal and extending radially out to the wall of the vessel said at least one sieve tray being fitted with a multitude of small holes or slots allowing the passage of rising contact steam through said at least sieve tray and the spent material loaded on said at least one sieve tray, said at least one sieve tray being further equipped with a rotating valve or chute allowing the passage of said spent material to the adjacent inferior tray, said rotating valve or chute being substantially hermetic to said contact steam wherein said the at least one sieve tray is not hollow or steam-filled and located below the side vapour outlet and above the sparging tray.

11. The apparatus of claim 1, wherein said at least one opening of said pre-desolventising tray permits the spent material to be directly discharged to the adjacent inferior tray.

12. The apparatus of claim 7, wherein said at least one opening of said pre-desolventising tray permits the spent material to be directly discharged to the adjacent inferior tray.

* * * * *